July 5, 1927.
G. DORNES, JR
DRILLING TOOL
Filed March 2, 1926
1,634,322
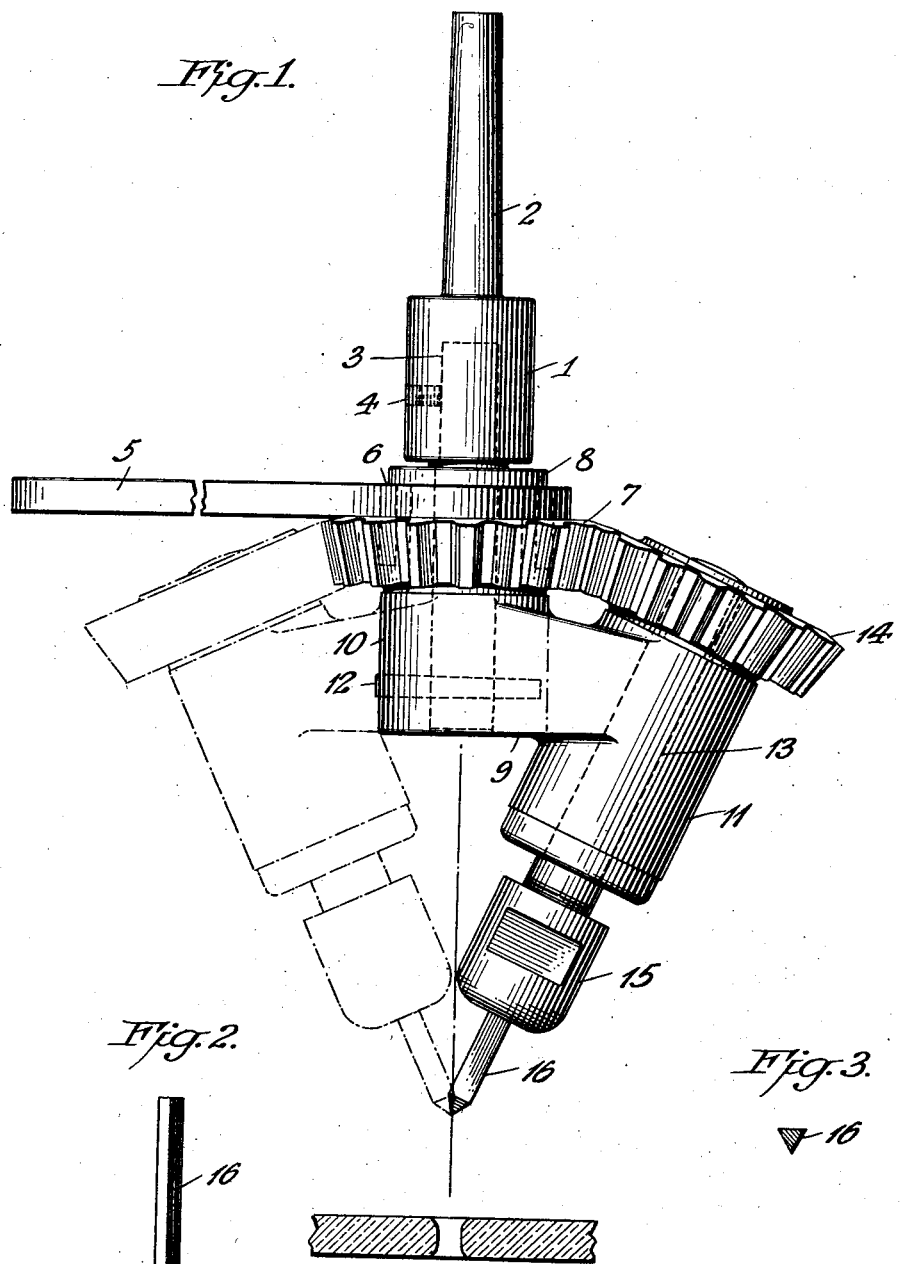
INVENTOR.
GEORGE DORNES JR
BY
*Sheffield Betts*
HIS ATTORNEYS Patented July 5, 1927.

1,634,322

UNITED STATES PATENT OFFICE.

GEORGE DORNES, JR., OF LONG ISLAND CITY, NEW YORK.

DRILLING TOOL.

Application filed March 2, 1926. Serial No. 91,711.

This invention relates to improvements in drills and more particularly to drills adapted to make holes in glass, porcelain and similar materials.

Heretofore the drilling of such materials has been a slow and laborious process involving a high degree of uncertainty and danger of breaking the material being drilled.

One object of the present invention is to provide a tool with which these materials may be easily and safely drilled in a short time.

Another object of the invention is to provide a tool in the form of a compact portable drilling device which may be operated either by connecting the same with a spindle of an ordinary drill press or by rotating the shank thereof by means of a hand bit-brace or breast-drill.

A further object is to provide a drill in which the axis of the cutting tool is inclined to the surface of the work and given a planetary motion whereby a sufficient clearance between the cutting tool and the work is provided.

The invention will be fully understood from the following description taken in connection with the accompanying drawings and its scope will be pointed out in the appended claims.

In the drawings, Fig. 1 is a side elevation of my improved drilling tool.

Fig. 2 is a side elevation of a preferred form of cutting tool or drill.

Fig. 3 is a cross-sectional view of the cutting tool or drill.

Fig. 4 is a cross-sectional view of a piece of drilled plate glass showing approximately the shape of the hole produced by the drill.

In the preferred embodiment of the invention shown in Fig. 1, the numeral 1 indicates a holder having a standard tapered shank 2 adapted to be inserted into the spindle of drill press and to be rotated thereby. If desirable, the shank 2 may be provided with a square or other shaped section at its upper end whereby it may be inserted into an ordinary hand brace for turning. The lower part of the holder 1 is provided with a cylindrical axial hole in which a shaft 3 is securely held by a set screw 4.

A handle 5, freely movable with respect to the shaft 3, is provided to prevent a portion of the apparatus hereinafter described from rotating. A bevelled gear 7 with respect to which the shaft 3 may rotate freely is positioned just below the handle 5 and is fastened thereto preferably by a pin 6. A collar 8, rotatable with the shaft 3, prevents upward movement of the handle 5 along this shaft.

A yoke 9 terminating in two substantially cylindrical portions forming bearings 10 and 11 inclined to each other, is fixed to the shaft 3 by means of a pin 12 and a shaft 13 is rotatably carried in the outer cylindrical portion 11. A bevelled gear 14 is keyed or otherwise fastened at the upper end of this shaft 13, and is in mesh with the bevelled gear 7.

The cylindrical bearing 10 prevents downward movement of the gear 7. The handle 5 and the gear 7 thus constitute a stationary part of the apparatus.

A chuck 15 is attached to the lower end of the shaft 13 and is adapted to hold the cutting tool 16. The preferred form of tool is an elongated piece of tool steel or similar material of triangular cross-section having its end bevelled to a three sided point, as illustrated in Figs. 1 and 2. It is obvious, however, that cutting tools of various cross-sections having similar cutting edges may be used with this apparatus.

It has been found that the best results in drilling are accomplished when the point of the tool 16 lies on the projected axis of the shaft 3, as shown in Fig. 1.

The operation of the drill may be briefly described as follows:

The shank 2 is inserted into a correspondingly tapered hole in the spindle of a drill press. The bevelled gear 7 is held in a fixed position by the handle 5 while a rotary motion is given to the shank 2, causing the outer bearing 11 of the yoke 9 and its appurtenances to revolve about the axis of the shaft 3, giving the tool 16 an orbital rotation. As the gears 7 and 14 are in mesh, the shaft 13 and consequently the cutting tool 16 will have an additional rotation about their own axis. A suitable fluid such as turpentine is used to facilitate the cutting action of the tool.

As shown in Fig. 4, the hole drilled is countersunk at both faces of the glass thus permitting screws or other fastening devices to lie flush with the surface of the glass. This form of hole is produced by cutting the hole half way through the material and then reversing the material so that the hole is finished from the opposite side. After reversal the hole may be enlarged as desired.

In the form shown in the drawings, the cutting tool 16 revolves twice as fast about its axis as does the shank 2 about its axis, due to the revolutions of the planetary gear about the axis of the spindle of the drill press. The edges of the drill are made to approach and recede from the surface being cut and move along epicycloidal curves which assure sufficient clearance for the tool during the cutting operation.

Obviously, the ratio between the gears 7 and 14 may be changed if desired and the inclined spindle 13 may be rotated by other means connected with the shaft 3 without departing from the spirit of my invention.

I claim:

1. A glass drilling tool comprising, a shank adapted to engage the spindle of a drill press or similar rotating device, a yoke rigidly attached to said shank and provided with an inclined bearing at its outer end, a shaft rotatably mounted in said bearing, means at the upper end of said shaft for rotating the same, a chuck carried by the lower end of said shaft, a member rotatably carried by said shank for causing a planetary motion of said rotating means, and a handle for holding said member stationary when said shank rotates.

2. A glass drilling tool comprising, a shank adapted to engage the spindle of a drill press or similar rotating device, a yoke rigidly attached to said shank and provided with an inclined bearing at its outer end, a shaft rotatably mounted in said bearing, a chuck carried by the lower end of said shaft, a gear carried by the upper end of said shaft, a gear rotatably mounted on said shank and engaging said first mentioned gear and provided with a handle to hold the same stationary.

3. A glass drilling tool comprising, a shank adapted to engage the spindle of a drill press or similar rotating device, a yoke rigidly attached to said shank and provided with an inclined bearing at its outer end, a shaft rotatably mounted in said bearing, a beveled gear mounted on the outer end of said shaft, a triangular, pointed drill carried by the lower end of said shaft, a beveled gear rotatably mounted on said shank and engaging the first mentioned gear, and a handle fixed to last named gear for holding the same stationary.

GEORGE DORNES, JR.